United States Patent [19]

Sawada et al.

[11] Patent Number: 5,195,773
[45] Date of Patent: Mar. 23, 1993

[54] COVER FOR ACCOMMODATING AN AIR BAG

[75] Inventors: Masami Sawada; Yuichi Nanbu; Takayasu Zushi, all of Shiga, Japan

[73] Assignee: Takata Corporation, Tokyo, Japan

[21] Appl. No.: 684,849

[22] Filed: Apr. 15, 1991

[30] Foreign Application Priority Data

May 24, 1990 [JP] Japan .................................. 2-134683

[51] Int. Cl.$^5$ ............................................. B60R 21/16
[52] U.S. Cl. ................................... 280/728; 280/731; 280/732; 280/743
[58] Field of Search ................ 280/731, 732, 743, 728

[56] References Cited

U.S. PATENT DOCUMENTS

| 4,148,503 | 4/1979 | Shiratori | 280/731 |
| 4,903,986 | 2/1990 | Cok | 280/743 |
| 5,060,971 | 10/1991 | Nanbu | 280/728 |

FOREIGN PATENT DOCUMENTS

| 363986 | 10/1989 | European Pat. Off. . | |
| 428935 | 5/1991 | European Pat. Off. | 280/743 |
| 3043077 | 11/1980 | Fed. Rep. of Germany . | |
| 3904977 | 1/1990 | Fed. Rep. of Germany | 280/743 |
| 184549 | 7/1988 | Japan | 280/743 |
| 220945 | 9/1990 | Japan | 280/743 |
| 2228719 | 9/1990 | United Kingdom . | |
| 2239220 | 6/1991 | United Kingdom . | |

*Primary Examiner*—Richard A. Schacher
*Attorney, Agent, or Firm*—Kanesaka and Takeuchi

[57] ABSTRACT

A cover for accommodating an air bag, which is provided at its inner surface with an array of spaced holes for starting tear at a start of an operation of the air bag, is characterized in that ends of the holes in the direction of the array have acute shapes converging toward the adjacent holes, respectively.

7 Claims, 3 Drawing Sheets

COVER FOR ACCOMMODATING AN AIR BAG

FIELD OF THE INVENTION AND RELATED ART STATEMENT

The present invention relates to a cover for accommodating an air bag which is adapted to be activated to inflate and develop by sensing an impact and/or deformation at a crash of a vehicle.

A prior art cover for accommodating an air bag is provided with a weak portion at which a cover starts to tear along an intended line when the air bag is activated. This weak portion is formed, for instance, of a continuous groove or intermittent grooves provided at the intended line (tear line) to be torn. There has been a cover of a two-layer structure which has a hard layer (core layer) and a soft layer (surface layer), and is provided with a slit along the tear line in the hard layer (core layer).

In the prior art cover for accommodating the air bag, the weak portion has a uniform weakness through its length. Therefore, the position in the weak portion at which the tear starts may vary depending on a manner which the air bag accommodated in the cover is folded. For example, the tear of the weak portion starts at a position near an end of the cover in some cases. Further, at an extremely low temperature, the cover may tear in an unexpected manner.

OBJECT AND SUMMARY OF THE INVENTION

It is an object of the invention to provide a cover for accommodating an air bag in which tear surely propagates along a direction of an array of holes.

A cover for accommodating an air bag according to the invention is provided at its inner surface with an array of spaced holes for starting tear at a start of an operation of the air bag, wherein ends of the holes in the direction of the array have acute shapes converging toward the adjacent holes, respectively.

In the cover for accommodating the air bag of the invention, the tear starts at the spaced holes aligned in the inner surface. The tear of the cover propagates from the acute ends of the holes to the adjacent holes. Therefore, the tear of the cover can surely spread in the direction of the array of holes.

DESCRIPTION OF THE PREFERRED EMBODIMENT

Embodiments will be described hereinafter with reference to the drawings.

Figure 1:
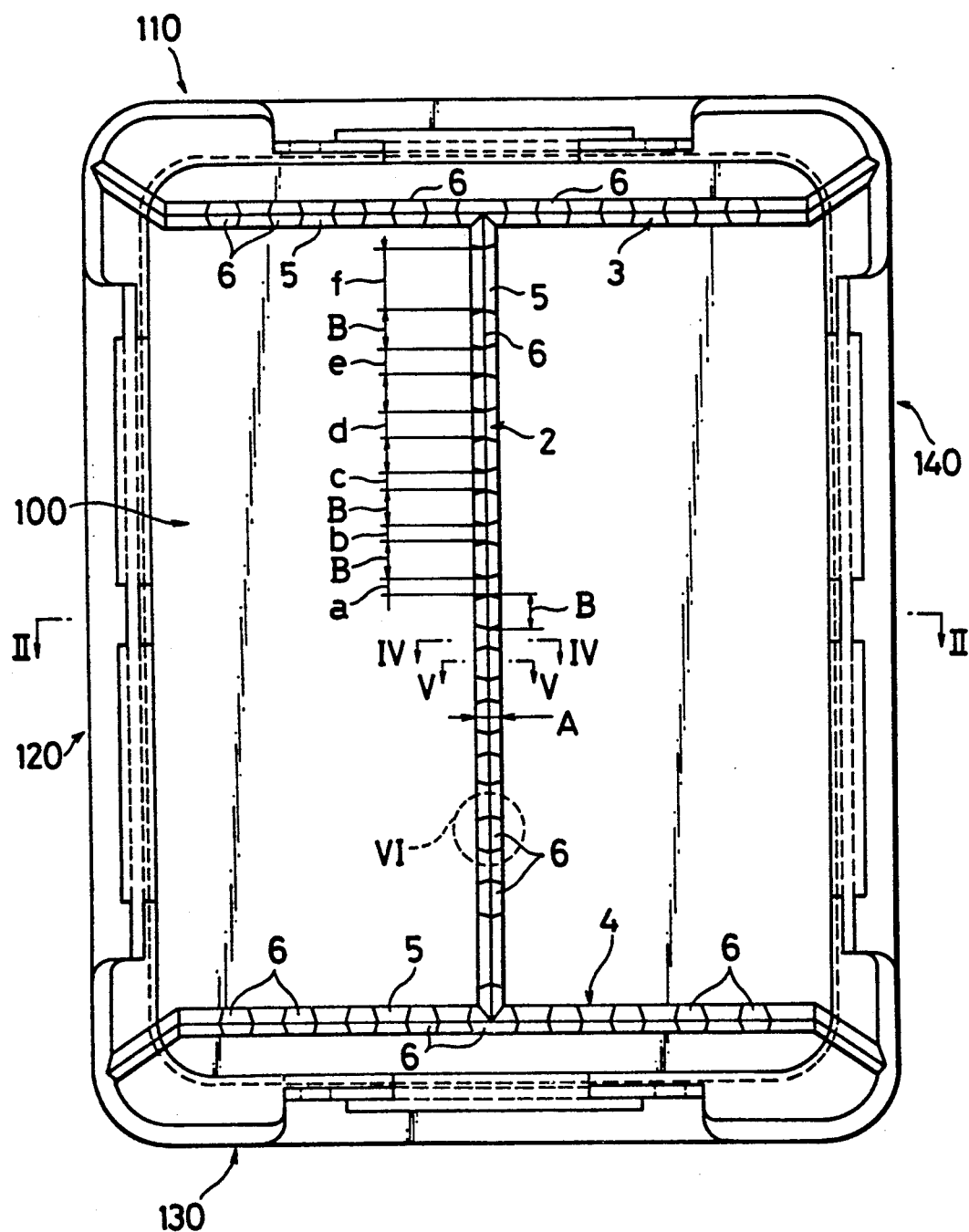
FIG. 1 is a bottom view of a cover according to an embodiment of the invention.
Figure 2:
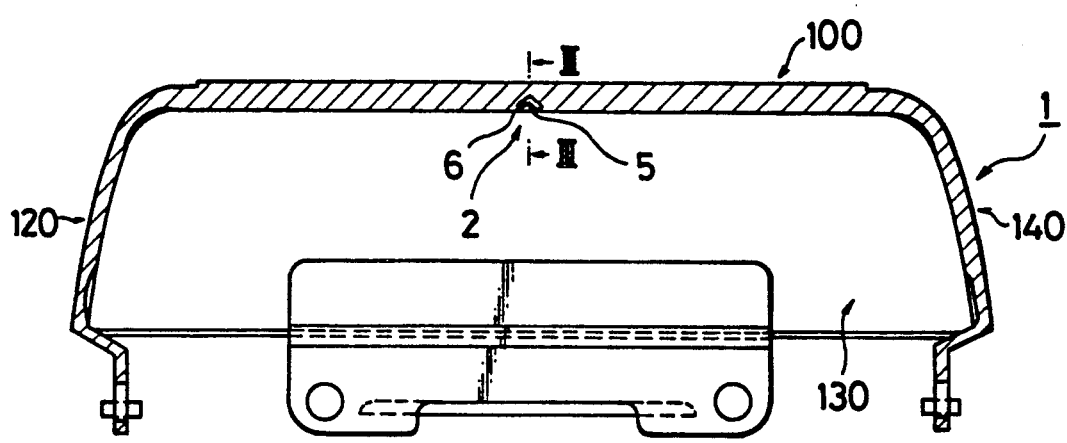
FIG. 2 is a cross section taken along line II—II in FIG. 1.
Figure 3:
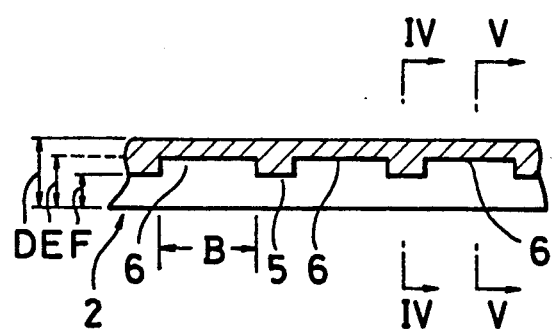
FIG. 3 is a cross section taken along line III—III in FIG. 2.
Figure 4:
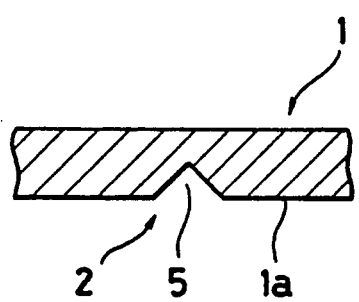
FIG. 4 is a cross section taken along line IV—IV in FIGS. 1 and 3.
Figure 5A:
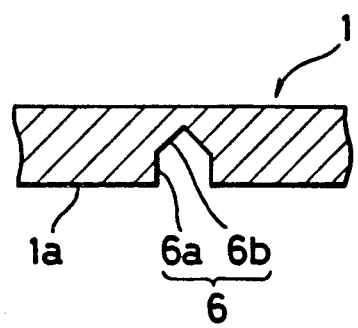
FIGS. 5A is a sectional end view taken along line V—V in FIGS. 1 and 3.
Figure 5B:
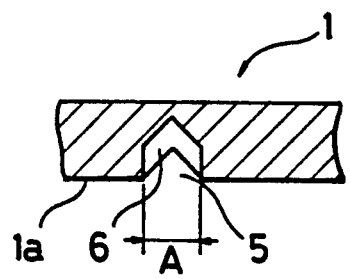
FIG. 5B is a sectional view taken along the same line.
Figure 6:
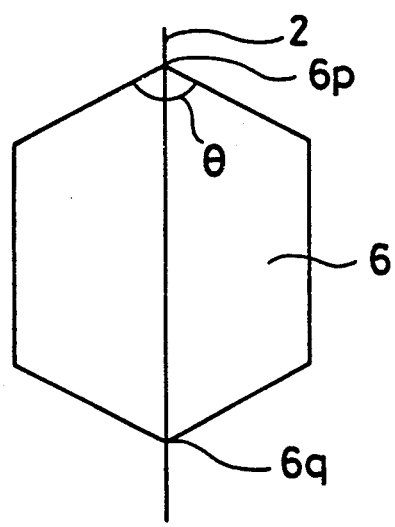
FIG. 6 is an enlarged view illustrating a major part in FIG. 1.

FIG. 1 is a bottom view of a cover for accommodating an air bag according to an embodiment of the invention, and FIG. 2 is a cross section taken along line II—II in FIG. 1. FIGS. 3, 4 and 5 are enlarged sectional views illustrating major parts in FIG. 1. Specifically, FIG. 5A is a sectional end view and FIG. 5B is a sectional end view. Further, FIGS. 3, 4, 5A and 5B are enlarged views. FIG. 6 is an enlarged view of a part VI in FIG. 1.

A cover 1 has a nearly oblong shape, and has a main plate 100 of a nearly oblong shape and four erected pieces 110, 120, 130 and 140 erected from four sides of the main plate 100. The main part 100 and the erected pieces 110-140 are integrally formed of a synthetic resin. This cover 1 is provided with tear line formed as a central tear line 2 and end tear lines 3 and 4 for starting tear when an air bag is activated. The center tear line 2 extends through a central portion of the cover 1 in a lengthwise direction of the cover 1. The tear lines 3 and 4 extend in a widthwise direction of the cover 1 and are disposed near ends of the cover 1. The tear line 2 and the tear lines 3 and 4 are continuous to each other.

These tear lines 2, 3 and 4 include a continuous groove 5 and holes 6 which are formed in the groove 5 and are spaced from each other. As shown in FIG. 4, the groove 5 has a triangular section. As shown in FIG. 5A, each hole 6 has side walls $6a$ perpendicular to a rear surface $1a$ of the cover 1 and inclined portions $6b$ which are formed at bottoms of these side walls $6a$ to form a triangular section, and thus has a pentagonal section. In the illustrated embodiment, the holes 6 have hexagonal shapes in a bottom view of the cover 1, as shown in FIG. 6. Ends $6p$ and $6q$ of each hole 6 located at two opposed apexes in the hexagon have acute shapes converging toward the adjacent holes 6, respectively. These ends $6p$ and $6q$ are aligned along center lines of the tear lines 2, 3 and 4.

In a middle portion of the cover 1 (plate), the holes 6 are closely disposed in the center tear line 2 with reduced spaces therebetween. These spaces between the adjacent holes 6 increases, i.e., the density thereof decreases as the positions move toward the tear lines 3 and 4. In the illustrated embodiment, the distances a, b and c between the holes 6 shown in FIG. 1 are equal to each other, and distances d and e are also equal to each other. The distances a, b and c are determined to be minimum, and the distances d and e are larger than them, but are smaller than a maximum distance f.

In the tear lines 3 and 4, the distances between the adjacent holes 6 are substantially equal to each other. However, in a manner similar to the tear line 2, the distances between the adjacent holes 6 at the middle portions in the lengthwise direction of the tear lines 3 and 4 may be small and distances between the adjacent holes 6 may be increased as the positions move away from the middle portions.

For example, material of the cover 1 of the invention is preferably, but not restricted to, thermoplastic polymer of JIS-K7203 having a bending elastic modulus of 1000 kg/cm$^2$ or more. Specifically, the material may be polyolefine contained soft material or thermoplastic elastomer containing olefine, styrene, polyester, polyurethane, vinyl chloride or polyamide. Rim-urethane including an inserted net is also preferable.

With respect to sizes a-f shown in FIG. 1, although the invention is not restricted to the followings, a, b and c are 3 mm, d and e are 5 mm and f is 7 mm. Further, the holes 6 and the grooves 5 have a width A of 2-5 mm. A length B of each hole 6 is 3-5 mm. If the holes 6 have sizes smaller than a value in the above range, a mold for molding the cover 1 might often have a low durability. Contrarily, if the holes 6 have sizes larger than a value in the above range, the cover 1 might be broken relatively easily when a sharp object such as a fingernail pressed it.

The portions of the cover 1 at which the holes 6 are provided may preferably have a thickness (a difference between sizes D and E shown in FIG. 3) of about 0.1 to 2 mm. Portions forming the groove 5 other than the holes 6 may preferably have a thickness (a difference between the sizes D and F in FIG. 3) of 0.5 to 9.5 mm.

In the cover 1 thus constructed, when the inflating pressure of the air bag is increased, the middle portion of the cover 1 having the closely spaced holes and thus the minimum strength starts to tear. Once the tear starts in the middle portion, this tear is transmitted from the acute ends of the holes 6 to the acute ends of the adjacent holes and rapidly spreads up to the ends along the ear lines 2, 3 and 4. Thus, the ends 6p and 6q of the holes 6 are located on the center line of the groove 5, and the tear generated in the holes 6 spreads toward the adjacent holes 6 through the portions in the groove 5 other than the holes 6. The portions forming the groove 5 have the minimum thickness at its center lines so that the tear rapidly spreads along the center line of the groove 5.

In the above embodiment, the spaces between the holes 6 are reduced in the middle portion of the cover 1, so that the cover 1 may have the minimum strength at its middle portion. However, the minimum strength in the middle portion of the cover 1 may be achieved by increasing depths of the holes 6 in the middle portion.

Figure 7:
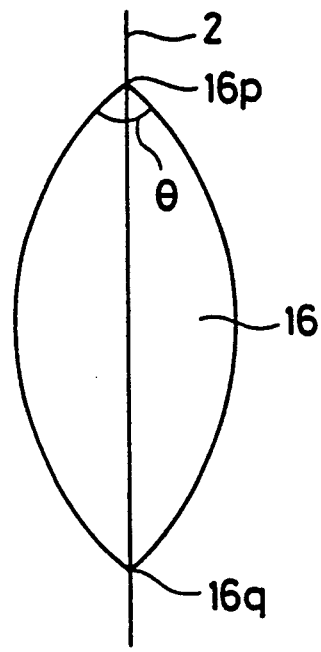
FIGS. 7 and 8 are enlarged views of a major part of a bottom of a cover according to an embodiment.
Figure 8:
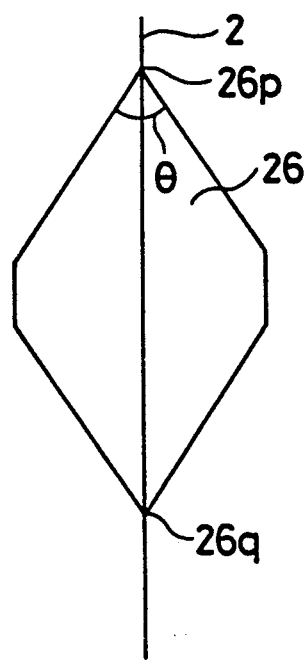

FIGS. 7 and 8 are plan views of holes according to different embodiments. A hole 16 shown in FIG. 7 has a lens-like shape in a bottom view. Two ends 16p and 16q of the lens-like shape are converged toward the adjacent holes, respectively, and are aligned along the center line of the tear line 2. A hole 26 shown in FIG. 8 has a hexagonal shape similar to a diamond shape in a bottom view, and two acute ends 26p and 26q of the hexagon are converged toward the adjacent holes and are aligned along the center line of the tear line 2.

The holes according to the invention may have shapes, other than those shown in FIGS. 6-8, if they have ends in the direction of the array thereof, which converge toward the adjacent holes. In the invention, an angle (theta in FIGS. 6-8) at the acute end may preferably be less than 160 degrees and particularly between 5 degrees and 90 degrees.

There is also no restriction with respect to sectional shapes of the groove and the holes. Further, it is not essential to provide the tear lines formed of the combination of the groove and holes, and they may be formed only of the holes.

According to the cover for accommodating the air bag of the invention, as described hereinabove, the tear surely propagates along the direction of the array of holes. Therefore, for instance, spaces between the holes can be adjusted to form a portion including the closely spaced holes and thus having a minimum strength, so that the tear starts at this portion having the minimum strength and can surely spread along the tear lines. Accordingly, an occupant constraint performance at the crash of the vehicle can be remarkably improved. Further, the cover will not scatter even if unexpected forces are applied to the cover.

What is claimed is:

1. A cover for accommodating an air bag, comprising:
   a main plate having an inner surface facing the air bag and side portions,
   a plurality of erected pieces extending from the side portions of the main plate, and
   a tear line formed at least in the main plate for tearing the cover, said tear line including a plurality of concave holes depressed inwardly from the inner surface of the main plate and extending along the tear line, each concave hole having a bottom, side walls and two ends along longitudinal direction of the tear line, each end having an acute angle defined by convergence of the side walls so that the ends with acute angles of the holes disposed adjacent to each other face against each other, distances between the concave holes situated adjacent to each other being changed so that the distance in a middle of the main plate is smaller than the distance in edge portions of the main plate to thereby allow the cover to be easily opened along the tear line upon inflation of the air bag.

2. A cover of claim 1, wherein said acute ends of said holes have angles of 5 degrees to 90 degrees.

3. A cover of claim 1, wherein said bottom of the concave hole includes inclined portions to converge with each other to tear the cover along a converged portion of the inclined portions of the concave hole.

4. A cover of claim 1, wherein said tear line includes a continuous groove for defining the tear line, said concave holes being formed inside the groove to further extend inwardly of the cover.

5. A cover of claim 4, wherein said continuous groove has inclined portions to converge with each other to tear the cover along the inclined portions of the groove.

6. A cover of claim 1, wherein said tear line includes a central tear line extending at a middle portion of the main plate to cross the main plate, and end tear lines at the side portions of the main plate and connected to the central tear line.

7. A cover of claim 1, wherein said concave hole has a shape selected from the group consisting of hexagonal shape and lenslike shape in plan of the inner surface.

* * * * *